United States Patent [19]

Reed, Jr. et al.

[11] Patent Number: 5,600,089

[45] Date of Patent: Feb. 4, 1997

[54] HIGHLY PLASTICIZED ELASTOMERS

[75] Inventors: Russell Reed, Jr.; Vicki L. Brady, both of Ridgecrest, Calif.

[73] Assignee: The United States of America as represented by the Secretary of the Navy, Washington, D.C.

[21] Appl. No.: 351,855

[22] Filed: Dec. 7, 1994

[51] Int. Cl.$^6$ .......................... C06B 45/36; C06B 45/10; C08J 3/00; C08L 75/00

[52] U.S. Cl. ................................ 149/19.4; 149/4; 149/88; 524/189; 524/259; 524/260; 524/296; 524/441; 524/590

[58] Field of Search ..................... 524/590, 189, 524/259, 260, 296, 441; 149/4, 19.4, 88

[56] References Cited

U.S. PATENT DOCUMENTS 4,706,567  11/1987  Schmid et al. .......................... 149/19.4
4,799,980   1/1989  Reed, Jr. ................................ 149/19.4

OTHER PUBLICATIONS

Odian, George, Principles of Polymerization, 2nd ed., 1981, pp. 20–25.

*Primary Examiner*—Paul R. Michl
*Assistant Examiner*—P. D. Niland
*Attorney, Agent, or Firm*—Stephen J. Church; Melvin J. Sliwka; John Forrest, Jr.

[57] ABSTRACT

Elastomers having a polyurethane binder are formed from a mixture including a tetrastar polyethylene oxide polyol with a molecular weight of at least 16000 daltons and a plasticizer present in a ratio of at least five parts by weight to one part of the polyol and provide high tensile strength, extreme elongation, great flexibility, and absence of voids. Energetic elastomers use a nitrate ester plasticizer with a curative having a functionality of at least three and an NCO/OH equivalent ratio of about 2.5 and may include an energetic particulate filler. Inert elastomers use a non-volatile ester plasticizer, as dimethyl phthalate, with a curative having a functionality of two and an NCO/OH equivalent ratio not over 2.0. Inert elastomers simulating mechanical properties of energetic elastomers including a nitrate ester use plasticizers, as a non-volatile ester and a mixture including a bromoaromatic derivative, having densities above and below the nitrate ester density, 1,2,4-butanetriol trinitrate being replaced with dimethyl phthalate and a mixture of pentabromodiphenyl ether and an aryl phosphate. A particulate energetic organic filler is simulated by an inert organic chlorine derivative of similar density, cyclotetramethylenetetranitramine being replaced by 1,2,3,4,7,8,9,10,13,14,14-dodecachloro-1,4,4a,5,6,6a,7,10,10a,11,12,12a-dodecahydro-1,4,7,10-dimethanodibenzo (a,e) cyclooctene and permitting particulate aluminum to be used in the same proportions as in an energetic elastomer.

19 Claims, No Drawings

HIGHLY PLASTICIZED ELASTOMERS

BACKGROUND OF THE INVENTION

1. Field of the Invention

This invention pertains to the field of elastomers having a polyurethane binder. More particularly, it pertains to such elastomers formed from a polyol mixture having a high proportion of plasticizer, the elastomers being useful for voidless films, energetic compositions, and inert simulants for energetic compositions.

2. Description of the Prior Art

Elastomeric materials which have high tensile strength and great elongation to failure are desired for a variety of purposes. It is highly desirable that such elastomeric materials retain these properties although including fillers and adventious materials that are not elastomeric. These properties are enhanced by the absence of voids, and voidless elastomeric materials are required for leak-proof articles formed of films of such materials. Elastomers generated by curing from a liquid are particularly desirable since they may be formed by a variety of processes and in many shapes.

Elastomeric characteristics of materials related to the present invention are provided by the bending, rotation, and uncoiling of cross-linked polymeric chains or backbones forming a binder which determines the ultimate properties of the materials. In a relaxed state of the materials, flexible segments of the chains form coils which uncoil upon extension until rupture occurs. The length of the coiled segments between cross-links or rigid chain portions such as urethanes thus limits the extension that can be achieved prior to rupture.

However for elongation to occur, the chains must be separated by non-volatile liquid plasticizers which allow portions of the chains to move relatively. As a result, the toughness of an elastomer, which for the purposes of the present application is represented by the area under the stress/strain curve of the elastomer, is mainly determined by interaction between the binder and plasticizer, although dependent on other factors such as the kind and amount of curative and interactions of the binder and plasticizer with any relatively rigid fillers, for example, the particulate materials typically used to provide additional energy in energetic elastomeric materials. Toughness contributes to the insensitivity of energetic elastomers materials to undesired initiation and is, of course, highly desirable in other elastomeric articles such as coatings, flexible and expansible containers, caulking compounds, potting materials, adhesives, and articles formed by films or membranes.

Many binder and plasticizer materials are known; and U.S. Pat. No. 4,799,980 to Reed, Jr., one of the present inventors, which issued 24 Jan. 1989 and which is incorporated herein by reference, describes a variety of elastomers formed of these materials and useful for energetic materials, that is, explosives and propellants. Such energetic materials typically include particulate organic fillers and metals and yet must retain their elastomeric properties. However, elastomeric materials using the same or similar binders are useful for inert simulants for the energetic elastomers and are useful for elastomeric articles for any purposes wherein high tensile strength, great elongation, and toughness are desirable.

A particular problem with elastomeric materials is the presence of voids and microporosities which reduce strength and elongation and whose absence is essential for protective coatings and for articles such as containers, including bladders for supplying fluids, and for articles, such as condoms and gloves, for preventing the transmission of viruses and other substances injurious to health. Elastomers formed by evaporation of a liquid, which may be a solvent or may be a carrier liquid as in latexes, tend to develop voids. Voids also develop where polymerization or coagulation of particles is interrupted by solid impurities that are not wetted by the curing elastomer, as is the case with the macromolecules forming latexes.

It is thus highly desirable to provide elastomers formed without volatile solvents and from liquids composed of relatively small molecules that are able to penetrate into the surface microstructure of solids. Voids are also avoided by elastomers formed by polymerization, so that there is essentially no shrinkage, and by polyols having sufficient molecular weight to minimize exothermic effects. For avoidance of voids it is desirable that an elastomer have polar groups that enhance bonding to many substances although without forming bonds rigid enough to reduce elongation. Such elastomers formed without volatile solvents and by polymerization of microstructure penetrating molecules without shrinkage and with polar bonding, as to substrates, without forming bonds rigid enough to reduce elongation are also elastomers most effective for coating, caulking, potting, and adhesive purposes.

A desirable feature of elastomers used for certain purposes, such as bladders, is that the polymer chains of the elastomer be uncoiled easily so stress increases slowly with increasing strain. This provides a relatively constant force over a wide range of elongation. However, continued elongation brings the chains closer together so that interaction between cross-links or chains occurs and provides high ultimate strength.

For processing, as by casting or extrusion, it is required that an elastomeric material have suitable rheological properties before curing and even though including particulate fillers. Also for processing, it is highly desirable that an elastomeric system having a variety of uses be adapted to vary the rate of curing and that curing be possible over a range of easily provided temperatures. It is further desirable that polymerization be possible in situ at the microsurfaces of solid fillers and impurities for adhesion of the binder thereto.

It is also desirable that an elastomers be adapted for the inclusion of solid ingredients as medicinals or antiseptics by dissolving them in the liquid binder solution.

various aspects of elastomers related to the present invention will now be discussed in greater detail. One aspect is that the functionality of polyols used to form elastomeric compositions has a dominant effect on the area under the stress-strain curve of the elastomer. For example, compositions having a difunctional polyethylene glycol (PEG) binder display a slowly rising area as chain length, measured by backbone atoms, increases. In such a difunctional PEG there are two carbons and one oxygen, or three skeletal atoms per mer unit. As these units are increased, elongation at rupture increases modestly while stress decreases because of the continuing decrease in cross-link density. Plasticized compositions containing a difunctional PEG having a molecular weight of 4500 daltons, such as those widely used in modern high energy, high elongation propellants, tend to have values of tensile stress at failure and elongations that are one-half or less than those of corresponding tetrafunctional polyalkalyene oxide (PAO) compositions. Such properties are the result of incomplete cross-linking and a partially formed polymer network; and it has been reported that cross-link density of PEG/nitroglycerine (NG) elastomers decrease markedly as a plasticizer/binder ratio by weight (Pl/Po) of 3 is exceeded.

However, compositions containing polyols with functionality of three or four are much tougher and exhibit a greater dependence on skeletal atoms. In these compositions, all hydroxyl groups should have equal reactivity so that a regular network can be formed, and the hydroxyls should be unhindered and primary since secondary hydroxyl groups react more slowly and, perhaps, less completely, than primary and thus limit the molecular weight of the network. Similarly, it is desirable that the urethane forming groups of a curative have equal reactivity.

At the higher functionalities, a given chain length is more effective because the quaternary and tertiary carbon cross-links are more efficient than urethane cross-links which may be relatively fragile, since they are polar and rigid in nature, as compared to the resilient carbon cross-links in the polyol moiety. As a result, carbon cross-links are critical in attaining regular and fully cross-linked polymer networks. As a polyether elastomer having such networks is extended, the polyether is uncoiled easily so that stress increases slowly as strain increases with continued elongation bringing the chains closer together so that interaction between urethane cross-links or chains occurs and the stress rises increasingly with further strain.

Films and adherent coatings formed from hydroxyl terminated polyethers provide liquid curable, plasticized urethanes which are single-phase and contain no volatile solvents or other substances to create voids and for which nonvolatile polyols capped with isocyanates are effective as relatively non-toxic plasticizers. As before mentioned, liquids that can be polymerized to form elastomers have an inherent ability to bond to fillers and to substrates since these liquids are composed of relatively small molecules that are able to penetrate into the surface microstructure of solids to a degree not possible for the macromolecules contained in many lattices and since in situ polymerization of polyols occurring in the microsurface tends to enhance adhesion between the polymer-filler adhesion. Voids are also avoided by binders formed from relatively high molecular weight polyols, such as those having a weight of 15,000 or more daltons, which have essentially no shrinkage as polymerization occurs. Polyols of such weights also minimize polymerization exothermic effects that might damage binders or fillers.

Polyether binders have an affinity for polar solids forming substrates, intentional fillers, and adventious impurities. While solids that have a strong affinity for binders are generally not desirable because they reduce elongation, as by preventing the formation of coiled flexible segments; binders and solids with no affinity undergo early and irreversible dewetting, the tendency of a binder to pull away from such solids when the composite of binder, plasticizer, and composite undergoes tensile stress. However, the weak affinity of hard urethane linkages for such solids desirably reduces dewetting without adversely reducing elongation.

This advantage of urethane groups is also provided by the amide linkage in proteins, which bonds tenaciously to polar substrates of polar materials. However, the amide units are not separated by long flexible segments so that the proteins have little elasticity and synthetic amides are not conveniently formed by the curing of liquids at ambient temperature.

Polyols, such as the oxetanes, having large pendant groups tend to have reduced toughness, perhaps because of internal plasticization contributed by the pendant group which, in any event, reduces the number of load-bearing atoms between cross-links.

Despite the advantages of liquid polyethers, some such as polypropylene glycol (PPG), polytetramethylene glycol (PTMG), and butylene glycol (BG), are incompatible with inert and energetic plasticizers. PPG and BG also have secondary hydroxyl groups which react more slowly and less completely than primary hydroxyls. It is thus more difficult to attain toughness with these glycols than with other liquid polyalkylene glycols. Even with binders which are predominately PEG, some plasticizers such as the nitrate esters used in energetic elastomers tend to inhibit cross-linking and thus limit molecular weight after polymerization, toughness, and plasticizer retention.

From the above it is believed apparent that elastomeric compositions having a polyurethane binder formed from a curable liquid which includes, together with a suitable plasticizer and a suitable curative, a tetrafunctional polyalkalyene oxide polyol having a relatively high molecular weight would have favorable tensile strength, elongation, bonding with fillers and impurities, and absence of voids. However, heretofore those skilled in the art have limited the plasticizer/binder ratio of such compositions to about 3.0 since, in related prior art compositions, the excess plasticizer exudes making these compositions dangerous, as with nitrate ester plasticizers, impractical as with health care articles and containers and, at least, undesirable for many purposes as where long storage and high ambient temperatures are involved. In the prior art it was also believed that, as pointed out above in connection with of polyethylene glycol/nitroglycerine elastomers, such a high Pl/Po decreases cross-link density resulting in lower tensile strength or elongation without any improvement in toughness and flexibility without breakage. As a result and when use of such a tetrafunctional polyalkalyene oxide polyol was contemplated in the prior art—see for example composition "DRX-4" of Table 2 of in the above U.S. Pat. No. 4,799,980 to one of the present inventors wherein the Pl/Po ratio was limited to 3.16 although the invention was directed to tough energetic compositions—relatively no more plasticizer was used than previously employed with difunctional polyalkalyene oxide derived compositions.

Explosive compositions which have high performance, toughness, and flexibility and which can be loaded into relatively long lengths of plastic tubing are believed unreported in the prior art. Curable such explosive compositions having elastomeric binders lack toughness and flexibility and thus break when bent. Also, the curable compositions cannot be loaded into such lengths of tubing because they contain high levels ($\geq 280\%$) of relatively coarse solids ($\geq 2150$ m particle diameter). Such explosive compositions have been provided in the form of noncurable pastes; but these pastes are unsatisfactory because they separate when loaded into tubes stored in a folded configuration. In these prior art compositions, breakage and separation adversely affects detonation propagation; and the performance of these compositions is limited because their limited flexibility requires a relatively high weight of inert tubing.

For development of and training in the use of a system using such a net and for evaluation of the properties of any explosive used therein—as well as for any other elastomeric explosive and propellant compositions, it is highly desirable that inert simulants be provided having substantially the same physical and mechanical properties as such energetic compositions.

SUMMARY AND OBJECTS OF THE INVENTION

The present invention provides elastomers having a polyurethane binder and formed from a mixture including a tetrastar polyethylene oxide polyol with a molecular weight of at least 16000 daltons and a plasticizer. The plasticizer is present in a ratio of at least five parts by weight to one part of the polyol so as to provide extreme elongation and great flexibility. The elastomers also provide high tensile strength and have an absence of voids.

Such elastomers which are energetic use a nitrate ester plasticizer, such as 1,2,4-butanetriol trinitrate (BTTN), with a curative having a functionality of at least three and an NCO/OH equivalent ratio of about 2.5. The energetic elastomers may include both organic and metallic energetic particulate fillers and yet retain substantial elongation and flexibility.

Such elastomers which are substantially inert use a non-volatile ester plasticizer, as dimethyl phthalate (DMP), with a curative having a functionality of two and an NCO/OH equivalent ratio not over 2.0. Such an inert elastomer is believed effective for articles requiring absence of voids with extreme elongation and great flexibility together with substantial tensile strength.

Such inert elastomers effectively simulate the corresponding mechanical properties of related energetic elastomers by replacing a nitrate ester plasticizer with a plasticizer of the same density formulated from a non-volatile ester having a density less than the nitrate ester and a mixture including a bromoaromatic derivative and having a density greater than the nitrate ester. In particular, 1,2,4-butanetriol trinitrate may be replaced with dimethyl phthalate and a mixture of pentabromodiphenyl ether and an aryl phosphate.

In such inert simulant elastomers, a particulate energetic organic filler is replaced by an inert organic chlorine derivative of similar density. In particular, cyclotetramethylenetetranitramine (HMX) is replaced by 1,2,3,4,7,8,9,10,13,14,14-dodecachloro-1,4,4a,5,6,6a,7,10,10a,11,12,12a-dodecahydro-1,4,7,10-dimethanodibenzo (a,e) cyclooctene which is a fire retardant and permits particulate aluminum to be used in the same proportions as in an energetic elastomer.

It is an object of the present invention to provide tough elastomers which may have both high tensile strength and great elongation.

Another object is to provide such elastomers which are relatively insensitive energetic explosive and propellant materials.

Still another object is to provide such elastomers which are inert and yet simulate the mechanical properties of corresponding energetic elastomers.

Yet another object is to provide such elastomers useful for articles formed by films of the elastomers.

A further object is to provide elastomers which are effective for the above purposes and are substantially without voids.

A still further object is to provide elastomers which are effective for the above purposes and which bond to non-elastomeric materials purposely or adventiously present in mixtures from which the elastomers are formed.

A particular object is to provide such elastomers having the above and other advantageous properties due to a relatively large proportion of plasticizer that is fully retained in the elastomer.

DETAILED DESCRIPTION

Elastomers of the present invention are characterized by unusual strength and elasticity and are attained by converting solutions of polyether polyols of high functionality and molecular weight in plasticizers to lightly cross-linked polyurethanes.

Although the present invention was stimulated by the need for munitions with decreased sensitivity and flexibility as provided by elastomeric explosives and propellants of increased toughness, the present invention is equally applicable to inert elastomers including those for personal use.

Compositions of the present invention are elastomers formed from polyols which are waxes and must be dissolved in non-volatile liquids which are termed "plasticizers" and separate crystalline chains formed by further polymerization of the polyols to allow bending and rotation of the chains and to permit processing of the compositions into appropriate articles. In such elastomers, the most important factor is the backbone structure of the polyol as this structure affects the ability to retain inert and energetic plasticizers, the location of terminating primary hydroxyls forming urethane bonds between the polyols, the fraction of weight made up by load-bearing carbon and oxygen atoms, and the chemical compatibility with typical fillers.

In the following examples, the materials and mixing and curing procedures are, in general, all well known in the energetic material and elastomer arts and common acronyms, which are identified herein, are used for the materials. However, certain of the materials are now particularly identified and discussed.

"PAO 24-13", wherein "PAO" being an acronym for polyalkylene glycol, is a tradename for a tetrastar polyethylene oxide polyol available from BASF Wyandotte, Wyandotte, Mich. This polyol has a functionality of four; has the formula

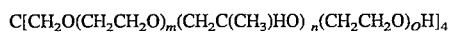

$$C[CH_2O(CH_2CH_2O)_m(CH_2C(CH_3)HO)_n(CH_2CH_2O)_oH]_4$$

where "m"=17, "n"=2, and "o"=84, and has an equivalent weight of about 4500 daltons.

"Dechlorane" is a tradename for a granular chlorine derivative available from Occidental Chemical Corp., Dallas, Tex. This material is a chlorinated tricyclic hydrocarbon compound, 1,2,3,4,7,8,9,10,13,14,14-dodecachloro1,4,4a,5,6,6a,7,10,10a,11,12,12a-dodecahydro-1,4,7,10-dimethanodibenzo (a,e) cyclooctene. This material is used as a flame retardant, smoke source, and color enhancer in pyrotechnics, and is used in large quantities as a fire retardant in such electrical equipment as wire and cable insulation and connectors constructed of nylon material.

Any appropriate curative may be used for inert compositions of the present invention including the well-known curatives hexamethylene diisocyanate (HDI) and its biuret trimer. However, these inert compositions using HDI exhibit superior mechanical properties compared to those the buret trimer thereof. However, the nitrate esters plasticizers used in energetic compositions require the higher levels of isocyanate functionality of three or four to achieve optimal cross-link density.

"DE-60" and "DE-62" are trade names for plasticizers available from Great Lakes Chemical Co., Lafayette, Ind. and are relatively dense (1.9 g/cm$^3$) mixtures of pentabromodiphenyl ether and aryl phosphate esters, the DE-62 plasticizer having a lower acid content.

Any suitable catalyst may be used in appropriate amounts with compositions of the present invention; however, triphenylbismuth (TPB) is, typically, used due to its contribution to extended pot life when activated by dinitrosalicylic (DNSA) acid to produce the actual catalyst in situ.

In an inert composition of the present invention, aluminum did not require replacement since no evidence of aluminum activity was found with the halogen containing plasticizers as shown by safety tests involving impact, friction, and exposure to flame. It is believed that this is due to such activity being difficult to initiate in presence of the polyalkylene oxide binder and dimethyl phthalate plasticizer. Spherical aluminum particles are effective to enhance the processibility of compositions of the present invention.

It is to be understood that "inert" as used herein in reference to a composition does not mean that the composition is completely inert in the sense that it will not even burn, but only that the composition will not detonate or deflagrate and is otherwise suitable for simulating the physical and mechanical properties of a composition which is undesirably energetic for many tests. However when exposed to open flame, the inert compositions of the following examples do not burn, but only melt.

In an inert composition of the present invention having an aluminum filler, the proportion of aluminum, density 2.7 g/cc, may be increased somewhat over that of the corresponding energetic composition to adjust for the inert chlorinated tricyclic hydrocarbon filler compound having a somewhat less density, 1.84 g/cc, than that of a substituted for energetic filler such as HMX, density 1.9 g/cc.

EXAMPLE I

A flexible explosive composition has the following formulation in parts by weight with a plasticizer/binder ratio (Pl/Po) of about 5.25 in accordance with the present invention. This composition has the property—which as seen from the following Example III is not present with the Pl/Po ratio of about 3 regarded as the maximum in above-described prior art belief and practice—of such flexibility that, when the composition is disposed in a cylindrical, rope-like configuration of 0.3 inch diameter, the composition has a bend radius of less than ¼ inch without breaking or even developing cracks; this property of flexibility being present with the further property that the nitrate ester plasticizer does not exude—this further property also being contrary to the above-described prior art belief and practice. The formulation of this explosive composition, which is effective for the before mentioned explosive net and is believed effective for commercial blasting applications as in breaking irregular masses, is:

| binder, "PAO 24-13", & curative | 5.543 |
| plasticizer, BTTN | 29.167 |
| n-methyl-p-nitroaniline (MNA) stabilizer | 0.291 |
| HMX particulate filler (6 μm) | 55.000 |
| aluminum particulate filler, spherical 5 μm | 10.000 |

The composition is used with the biuret trimer of hexamethylene diisocynate present in an amount such that the NCO/OH equivalent ratio is about 2.5 as, typically, necessary with a nitrate ester plasticizer which tends to inhibit cross linking. The above-identified TPB/DNSA catalyst was used, and physical and mechanical properties of the cured composition include:

| density, g/cc, | 1.764 |
| maximum stress at 2 in/min, psi | 180 |
| elongation, at 2 in/min, % | 970 |
| maximum stress at 16524 in/min, psi | 171 |
| elongation, at 16524 in/min, % | 970 |

EXAMPLE II

A inert composition, which has a Pl/Po ratio of about 5.15 in accordance with the present invention and greater than the Pl/Po ratio of about 3 regarded as the maximum in above-described prior art belief and practice, is for simulating the mechanical properties of the above Example I explosive composition. Like the Example I composition, this Example II composition also provides the feature of a bend radius of less than ¼ inch for a rope-like cylinder of 0.3 inch diameter together with the feature of absence of exudation of components of the inert plasticizer mixture. These features, as before stated, are in contrast to the belief and practice of the prior art elastomers, the relatively limited flexibility of which is shown by Example III. This inert composition has the following formulation in parts by weight:

| binder, "PAO 24-13" | 5.663 |
| curative, hexamethylene diisocynate (HDI) | 0.145 |
| plasticizer, | |
| DMP | 15.838 |
| "DE-62" | 13.329 |
| "Dechlorane 515", particulate filler (average 9–11 μm) | 50.000 |
| aluminum particulate filler, spherical 5 μm | 15.000 |

In this composition, the difunctional curative, which is preferable in inert compositions containing a tetrafunctional binder and a non-volatile and non-energetic ester plasticizer, is present in an amount providing a NCO/OH equivalent ratio in a range of about 1.3 to about 1.5. The DE-62 plasticizer may also inhibit complete urethane formation since some excess of isocynate is required. The less dense dimethyl phthalate (DMP), 1.1 g/cm$^3$, and the more dense, 1.9 g/cm$^3$, "DE-62" mixture of brominated diphenyl ether and aryl phosphate esters were blended to achieve the BTTN density of 1.52 g/cm$^3$). While the boiling point, freezing point, and slow loss by evaporation of DMP are not suitable for tactically used energetic materials, these properties are satisfactory for a simulant, and the carbomethyoxy groups of DMP make it an effective plasticizer by enhanced ability to dissolve the oxygen rich polyether backbone of this binder. Bromoaromatic ethers, such as "DE-62", are sufficiently polar, especially in the presence of an aryl phosphate ester and DMP, to be compatible with the PAO binder. The Dechlorane, density 1.82 g/cm$^3$, was used as the inert filler to replace HMX, density 1.9 g/cm$^3$. The TPB/DNSA catalyst was used. This inert simulant composition has the following properties:

| density, g/cc, | 1.761 |
| maximum stress at 2 in/min, psi | 126 |
| elongation, at 2 in/min, % | 876 |
| maximum stress at 16524 in/min, psi | 132 |
| elongation, at 16524 in/min, % | 940 | which have been found satisfactory for simulation of the corresponding properties of the above-described flexible explosive composition including the suitability thereof for injection loading.

EXAMPLE III

A propellant composition, which has mechanical properties simulated by an inert composition shortly to be described in detail, has a trifunctional polyethylene polyurethane binder, a nitrate ester plasticizer, and particulate fillers including a nitramine, ammonium perchlorate and aluminum. It is believed that this propellant composition, when disposed in a rope-like cylinder of 0.3 inch diameter and bent, breaks before a bend radius of ¼ inch is attained. This Example III propellant composition has the following properties:

| | |
|---|---|
| density, g/cc, | 1.84 |
| stress at break 17,200 in/min, psi | 136 |
| elongation at break at 17,200 in/min, % | 240 |

A inert composition for simulating the mechanical properties of the above propellant composition utilizes the same "PAO 24-13" binder and substantially the same mixed plasticizer consisting of DMP and "DE-60F" as in the above Example II embodying the present invention. However, in this inert simulant composition the Pl/Po ratio is about 2.8 corresponding to the above described prior art belief and practice that a value for this ratio of about 3.0 is the maximum practical so that this Example III inert simulant composition, when disposed in a rope-like cylinder of 0.3 inch diameter and bent, breaks before a bend radius of ¼ inch is attained. This Example III inert simulant composition the following formulation in parts by weight:

| | |
|---|---|
| Binder "PAO 24-13" | 6.987 |
| Curative, | 0.416 |
| Plasticizer, DMP + "DE-60F" mixed to give 1.60 g/cc | 19.782 |
| "Dechlorane" particulate filler | |
| "515" (average 9–11 µm) | 48.5 |
| "35" (≧2 µm) | 1.5 |
| aluminum particulate filler, spherical | |
| 60 µm | 16.150 |
| 95 µm | 6.650 |

In this simulant, the biuret trimer of hexamethylene diisocyanate is used as the curative to provide an NCO/OH ratio of 1.37 which provided optimum properties as contrasted to 2.5 required for propellants with PAO binder and nitrate ester plasticizer.

The discussion above in regard to functionality of the curative and NCO/OH ratio, the ratio of the less dense DMP and the more dense mixture of brominated diphenyl ether and aryl phosphate esters mixed to achieve the nitrate ester density, suitability of DMP and bromoaromatic ethers, and substitution of a chlorinated tricyclic hydrocarbon compound for nitramine filler and ammonium perchlorate applies also to this Example III inert simulant composition which has the following properties:

| | |
|---|---|
| density, g/cc, | 1.80 |
| stress at break at 17,200 in/min, psi | 100 |
| elongation at break at 17,200 in/min, % | 260 |

Returning to the present invention, it is believed that an elastomeric composition in accordance therewith in having a Pl/Po ratio of at least about 5.0 and similar to that of the above Example II in having a corresponding polyurethane forming binder and one or more corresponding plasticizers—in particular such a composition utilizing only nonvolatile isocyanates such an as polyols capped with isocyanates and including the DMP of Example II—can provide at a combination of at least the tensile strength and elongation of these examples since the granular fillers thereof would be omitted. It has been found that Pl/Po ratios of 5 to 6 can be achieved in compositions of the present invention having excellent toughness and that compositions having such ratios from 6 to 10 do not exude plasticizer although toughness may decrease because due to lower tensile stress at failure.

Elastomeric compositions of the present invention should thus be useful for commercial articles including coatings and those articles constructed of films and requiring absence of voids and microporosities as provided by the absence of volatile solvents and the wetting of adventious solids when such binders are used. The long chain length and large amount of plasticizer of compositions in accordance with the present invention provide the relatively flat stress strain curve desirable for elastomeric uses identified above.

The mechanical properties of compositions in accordance with the present invention are different from those of many other inert and energetic compositions. For example, when "dog bone" tensile test specimens are tested, those in accordance with the present invention show a typical rubber expansion in that stress increases with strain. Also, volume expansion on dilatation is relatively small and appears reversible since the present compositions tend to be fully cross-linked to form a higher molecular weight network able to take up energy without bond breaking. On the other hand, typical compositions of the prior art containing a difunctional polyol show a decreasing stress as extension increases and exhibit much greater volume expansion with dilatation that is not reversible upon relaxation indicating that chemical bonds in the binder are being broken even early in the extension.

These improvements over the prior art may be due to the quaternary carbon cross-links of the tetrafunctional polyols utilized in the present invention being more resilient than the more rigid and polar urethane links of the cured composition. Also, the about 3% of propylene glycol polyether groups near the center of these polyols should enhance the flexibility of this region of the polymer. In any event, compositions of the present invention may be repeatedly stretched without damage to the polymer since the relatively large high-molecular network allows stress to be dissipated over a large volume to minimize rupture of the polymer with the result that "dog bone" tensile specimens of these compositions have been cut 25% of the distance through the specimens with comparatively little loss in elongation and tensile stress at failure.

Typically, low rate mechanical properties of elastomers are evaluated at an extension rate of 2 in/min and high rate mechanical properties are evaluated at rates from 10,000 in/min up to and exceeding 60,000 in/min; and, generally, mechanical properties at high rates are half or less than those obtained at low rate for the same composition. However, compositions of the present invention evaluated at an extension rate of 16,524 in/min have strain values greater than half their low rate values with virtually unchanged stress values.

The rate of curing to form elastomers of the present invention can be varied from minutes to days by the selecting the kind and amount of catalyst and the curing temperature. For examples, triphenylbismuth and acidic activators can be used to achieve pot lives of 1–3 days; ferric acetonyl acetate can affect curing in a few minutes; and small amounts of dibutyltin dilaurate may take 4 to 8 hours to gel with larger concentrations can cause curing within 10 minutes. In any event, curing can be accomplished at temperatures from ambient to 70° C.

All elastomers having a Pl/Po ratio of about 5.0 or more in accordance with the present invention have the above-described advantages; however such elastomers as are energetic are particular advantageous in that they are provide increased energy while providing the apparently inconsistent advantage of decreased sensitivity. The greater energy is due to the increased amount of nitrate ester plasticizer while prior art polyol binders limit the Pl/Po ratio about 3.0 due to exudation and due to unacceptably decreased tensile stress as this ratio is increased beyond 3.5. It is believed that energetic elastomers in accordance with the present invention will be less sensitivity since energy is provided by the tough and rubbery binder matrix binder instead by crystalline filler solids thereby minimizing the tendency to form hot spots as a result of crystal fracture and protecting the those crystalline solids used from physical damage.

As with other energetic elastomers, compositions of the present invention exhibit less advantageous mechanical properties as both particle size and solids level increase in that, while strain values remain satisfactory and the flexibility still permits a bend radius of less than ¼ inch in a about 0.3-inch cylindrical rope-like configuration, stress values and thus toughness are reduced.

NUCLEAR MAGNETIC RESONANCE STUDIES

Elastomeric compositions related to the present invention were evaluated by solid-state nuclear magnetic resonance (NMR) spectroscopy which has become increasingly important in the study of polymer phase structure, molecular dynamics, and blend miscibility. Two sets of experiments were conducted to evaluate a series of cured compositions in which the Pl/Po ratio of the above-identified polyol (PAO 24-13) to the nitrate ester plasticizer BTTN was varied from 0.5 to 6.0, the biuret trimer of hexamethylene diisocyanate being used as the curing agent.

In one set, Magic-Angle Spinning (MAS) nuclear magnetic resonance (NMR) spectra were obtained for the compositions and provide relaxation times reflecting molecular mobility on the MHz time scale. These spectra show that the changes in chemical shift are comparatively small from the standpoint of solid-state NMR which supports the view that the BTTN plasticizer is an extender that does not react with the polyol.

Due to the high levels of plasticizer characterizing the present invention, there was a question on whether some of the somewhat volatile BTTN would be driven off during curing and processing. However, quantitative evaluation of the MAS NMR spectra showed that there is, relatively, no more loss in plasticizer with a Pl/Po ratio of 5.0 than with a ratio of 1.0.

Certain solid-state NMR spin-lattice relaxation times were also determined for the compositions and indicate that an initial drop in relaxation time with increased plasticizer results from the plasticizer extending the polyol. From that point, an unchanging relaxation time suggests that the polyol portion of the polymer does not undergo any significant change in its internal mobility or motion so that, with increasing plasticizer, macroscopic flexibility arises solely from the increased BTTN content. Also, these relaxation times for the BTTN resonances all increase monotonically with increasing BTTN content thus indicating that the BTTN component of these systems is highly mobile and that this mobility increases proportionally with BTTN content.

In the second set, compositions consisting of 40% binder and 60% HMX were tested with Pl/Po ratios again being varied from 0.5 to 6.0, but with slower motions being indicated. These slower motions provide a particularly sensitive indicator of the phase structure of polymers and may be accessed by a solid-state NMR technique termed cross-polarization (CP) which is sensitive to distance, and the presence of motion in the solid system and is most effective for rigid systems in close proximity.

In CP spectra for filled compositions with Pl/Po of 3.0 and 5.0 3/1 and 5/1, the spectrum of the 3.0 material exhibits expected polymer and BTTN resonances expected, as well as a broad resonance arising from the HMX. In the spectrum of the 5.0 material, the BTTN resonances disappeared and the intensity of the polyol resonance was significantly reduced in comparison to this intensity in the 3.0 spectrum and to the intensity of the HMX resonance. This shows that, to the point of the 3.0 ratio, there is still some degree of ordering in the polymer network which may be envisioned as folding or overlapping of the cross-linked polyol lattice. At the 5.0 ratio, however, any residual order has been completely lost since the BTTN is completely mobile on the kHz time scale and cross-polarization to it is no longer possible. The fact that the intensity of the polyol resonance has been significantly reduced also reflects significantly decreased order and increased mobility for the polyol. This threshold at the 5.0 ratio is believed to represent the optimum plasticizer level for the tested system in terms of producing an elastomeric binder in that at this ratio the system has been fully plasticized as shown by the complete loss of the BTTN resonances with the result that plasticization beyond this point should have little further effect on the ordering of the polymer network.

Obviously, many modifications and variations of the present invention are possible in light of the above teachings. It is, therefore, to be understood that the present invention may be practiced within the scope of the following claims other than as described herein.

What is claimed is:

1. An elastomer comprising:

a polyurethane binder formed from a binder mixture including an at least tetrafunctional polyol and an isocyanate curative, said polyol having substantially a star structure and a molecular weight of at least about 16000 daltons; and a plasticizer present in said binder mixture in a ratio of at least about five parts by weight of said plasticizer to about one part by weight of said polyol.

2. The elastomer of claim 1 wherein said polyol is tetrafunctional and said molecular weight is in a range of about 16000 to about 30000 daltons.

3. The elastomer of claim 2 wherein said polyol has four arms of substantially identical structure, each arm having a molecular weight of at least about 4000 daltons.

4. The elastomer of claim 3 wherein each of said arms includes a plurality of ethyleneoxy moieties and terminates in a primary hydroxyl group.

5. The elastomer of claim 4 wherein each of said arms includes at least about two propyleneoxy moieties.

6. The elastomer of claim 1 wherein said polyol is tetrafunctional, said plasticizer is a non-volatile and non-energetic ester, and said curative has a functionality of two and is present in said binder mixture in an amount such that the NCO/OH equivalent ratio in said mixture is in a range of about 1.3 to about 2.0.

7. The elastomer of claim 6 wherein said plasticizer is dimethyl phthalate.

8. The elastomer of claim 1 wherein said polyol is tetrafunctional, said plasticizer is a nitrate ester so that the elastomer is an energetic material, and said curative has functionality of at least three and is present in said binder mixture in an amount such that the NCO/OH equivalent ratio in said binder mixture is in a range of about 2.25 to about 2.75.

9. The elastomer of claim 8 wherein said nitrate ester is 1,2,4-butanetriol trinitrate.

10. The elastomer of claim 8 wherein the elastomer further comprises an energetic filler of particulate material.

11. The elastomer of claim 10 wherein said particulate material includes cyclotetramethylenetetranitramine present in an amount by weight in a range of about 50% to about 70% and aluminum present in an amount by weight in a range of about 0% to about 20%.

12. The elastomer of claim 10 wherein the particles of said particulate material have a maximum dimension in a range of about 1 microns to about 15 microns.

13. The elastomer of claim 1:

wherein the elastomer is an inert elastomer having density, stress at break, and elongation at break simulating density, stress at break and elongation at break of an energetic elastomer including a predetermined nitrate ester as a plasticizer; and wherein said plasticizer of the inert elastomer comprises a plasticizer mixture of a first inert plasticizer material having a density less than the density of said nitrate ester and a second inert plasticizer material having a density greater than the density of said nitrate ester, said first inert plasticizer material and said second inert plasticizer material being present in said plasticizer mixture in proportions such that said plasticizer mixture has substantially the same density as said nitrate ester.

14. The inert elastomer of claim 13 wherein said first inert plasticizer material is a non-volatile ester and said second inert plasticizer material includes a bromoaromatic derivative.

15. The inert elastomer of claim 14:

wherein said inert elastomer has density, stress at break, and elongation at break simulating density, stress at break, and elongation at break of such an energetic elastomer having 1,2,4-butanetriol trinitrate as said predetermined nitrate ester; and wherein said first inert plasticizer material is dimethyl phthalate and said second inert plasticizer material is a mixture consisting substantially of pentabromodiphenyl ether and an aryl phosphate.

16. The inert elastomer of claim 13:

wherein said inert elastomer has density, stress at break, and elongation at break simulating density, stress at break, and elongation at break of such an energetic elastomer having a particulate energetic filler including a predetermined particulate energetic organic material; and wherein said inert elastomer further comprises a particulate inert organic chlorine derivative having a density substantially equal to the density of said predetermined particulate energetic organic material.

17. The inert elastomer of claim 16:

wherein said predetermined particulate energetic organic material includes cyclotetramethylenetetranitramine; and wherein said particulate inert organic chlorine derivative comprises 1,2,3,4,7,8,9,10,13,14,14-dodecachloro-,1,4,4a,5,6,6a,7,10,10a,11,12,12a-dodecahydro-1,4,7,10-dimethanodibenzo (a,e) cyclooctene.

18. The inert elastomer of claim 16:

wherein said particulate energetic filler further includes particulate aluminum; and wherein said inert elastomer further comprises particulate aluminum.

19. A elastomer comprising:

a polyurethane binder formed from a mixture including an at least tetrafunctional polyol and an isocyanate curative, said polyol having substantially a star structure and a molecular weight in a range of about 16000 daltons to about 30000 daltons; and a plasticizer present in said mixture in a ratio of at least about five parts by weight of said plasticizer to about one part by weight of said polyol so that the elastomer is fully plasticized as shown by loss of resonance of said plasticizer as determined by cross polarization and magic angle spinning nuclear magnetic resonance.

* * * * *